United States Patent [19]

Suzuki

[11] Patent Number: 5,006,095

[45] Date of Patent: Apr. 9, 1991

[54] RATCHET TYPE TENSIONER

[75] Inventor: Tadasu Suzuki, Kawagoe, Japan

[73] Assignee: Tsubakimoto Chain Co., Osaka, Japan

[21] Appl. No.: 530,548

[22] Filed: May 29, 1990

[30] Foreign Application Priority Data

May 31, 1989 [JP] Japan ................... 1-62463

[51] Int. Cl.⁵ .............................................. F16H 7/08
[52] U.S. Cl. ..................................... 474/111; 474/136
[58] Field of Search ........................ 474/101, 109–111, 474/113–117, 133, 135, 136, 138

[56] References Cited

U.S. PATENT DOCUMENTS

| 4,822,320 | 4/1989 | Suzuki | 474/111 |
| 4,874,352 | 10/1989 | Suzuki | 474/111 X |
| 4,881,927 | 11/1989 | Suzuki | 474/111 X |

Primary Examiner—Thuy M. Bui
Attorney, Agent, or Firm—Howson & Howson

[57] ABSTRACT

A ratchet type tensioner is disclosed. It comprises a ratchet having a plurality of teeth and a rack so as to prevent the plunger formed with the rack from retreating. The teeth of the teeth of the ratchet is n times that of the pitch of the rack, where n is an integer which is 2 or greater. The ratchet may mesh with racks of different pitches.

3 Claims, 1 Drawing Sheet

RATCHET TYPE TENSIONER

FIELD OF INVENTION

The present invention relates to a tensioner adapted to restrict the retreating movement of a plunger by means of a ratchet.

BACKGROUND OF INVENTION

A tensioner as referred to in this specification is utilized for imparting a predetermined tension to a chain, etc., which is adapted to transmit a torque from a crankshaft of an engine to a cam shaft. Such a tensioner includes a type in which a plunger is slidably received within a housing so as to be urged to protrude from the housing, and a ratchet is mounted to said so as to mesh with a rack formed on the plunger in order to prevent the plunger from retreating.

Conventionally, in such a tensioner, the pitch of the teeth of the ratchet is designed to be identical with that of the teeth of the rack. Thus, if the pitch of one of those members is varied, the other of the members needs be made anew so that there is a matching in the pitches of the respective teeth.

Ratchets are generally made by sintering. Consequently, every time there occurs a design change to the ratchet, remaking of the moldings becomes necessary, with the resultant higher manufacturing costs.

There exists a ratchet having a single tooth; however, it is not usually sufficient in terms of the strength.

SUMMARY OF INVENTION

The present invention provides a tensioner comprising a ratchet having a plurality of teeth and a rack, characterized in that the pitch of said teeth of the ratchet is n times that of the rack, where n is an integer which is 2 or greater.

For example, if there is a ratchet having teeth with the pitch L, the ratchet can mesh with not only a rack having the pitch of L, but also with a rack having the pitches of L/2, L/3 . . . L/n. Thus, according to the present invention, even if the pitches of the racks are different, only one type of a ratchet having a pitch which is a common multiple of those of the racks can mesh with the racks of different pitches.

Thus, the manufacturing costs for, such as, the molds, of the ratchets may be saved. In addition, the teeth of the ratchet according to the present invention may be made larger than the conventional ratchets having the pitch which is identical with that of the rack; and accordingly, the strength of the teeth against the breakage due to the retreating motion of the plunger may be increased.

PREFERRED EMBODIMENTS

Figure 1:
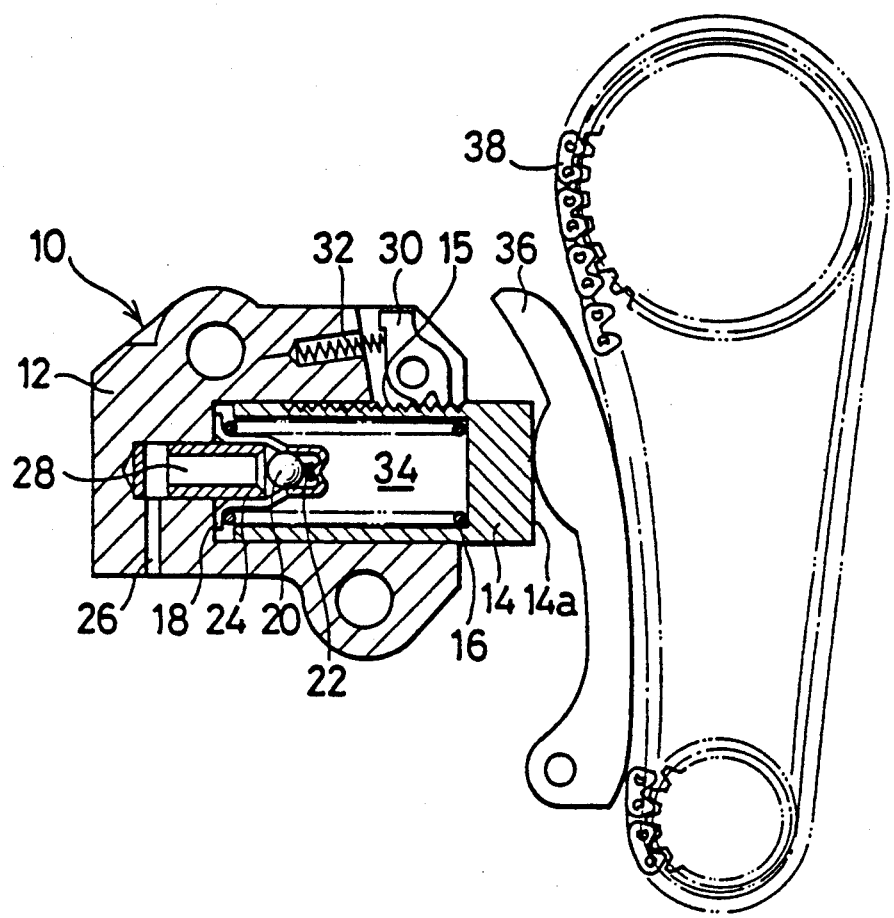
FIG. 1 is a section of a ratchet type tensioner according to the present invention.

FIG. 1 shows a ratchet type tensioner including the features of this invention. A cylinder-like plunger 14 having an opening at one end is slidably received within a housing 12. A rack 15 is formed on the surface thereof. Within the plunger 14, a spring 16 is accommodated so as to urge the plunger 14 in the protruding direction. Thus, the end surface 14a pushes the tensioner shoe 36 such that a tension may be imparted to the chain 38.

To the housing 12 and the ball seat 24, oil passages 26, 28 are provided respectively so as to supply pressurized oil from, for example, an oil pump (not shown) to an oil chamber 34 within the plunger 14. A check ball 20 is urged toward the ball seat 24 by means of a spring 22, one end of which abuts against the retainer 18. Between the oil passage 28 and the oil chamber 34, this check ball mechanism functions to allow oil to flow into the oil chamber 34 and prevent oil from flowing out of the oil chamber 34.

The rack 15 is formed on the surface of the plunger 14 as mentioned above. And, a ratchet 30 which is pivotably supported on the housing 12 is urged in the direction opposite to said protruding direction of the plunger 14 and is adapted to mesh with said rack 15. The plunger 14 may be prevented from retreating by means of the rack 15 and the ratchet 30.

Figure 2:
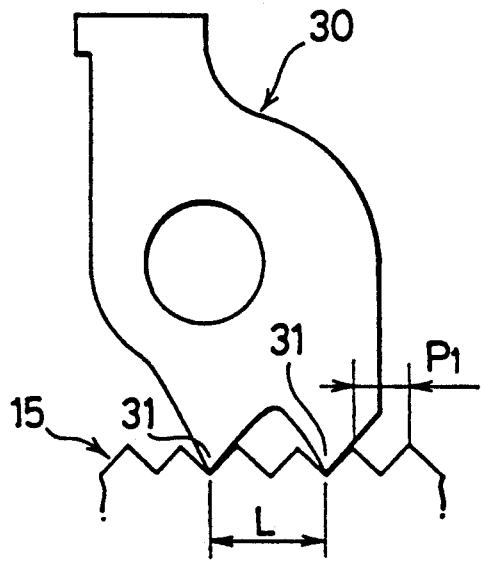
FIG. 2 is an illustration of the relationship between the ratchet and the rack when n is 2.
Figure 3:
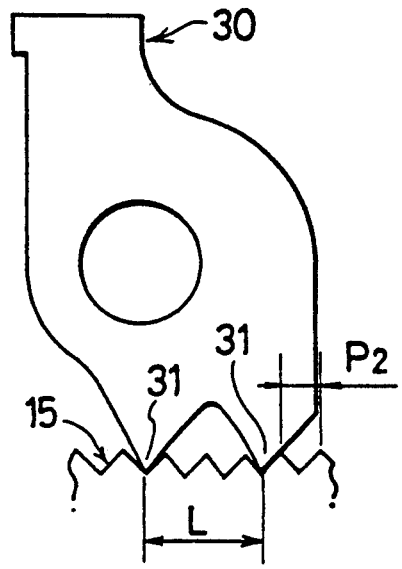
FIG. 3 is an illustration of the relationship between the ratchet and the rack when n is 3.

As shown in FIGS. 2 and 3, the ratchet 30 has two teeth 31, 31 and the pitch between the two teeth is L. On the other hand, the rack 15 is formed with the pitch P. The relationship between the pitches L and P is represented by the following formula:

$$L = n \times P \text{ where n is an integer which is 2 or greater.}$$

FIG. 2 illustrates the relationship between the ratchet 30 and the rack 15 when n is 2; in this case, the pitch $P_1$ of the rack 15 equals L/2.

On the other hand, FIG. 3 shows the relationship between the ratchet 30 and the rack 15' when n is 3; in this case, the pitch $P_2$ of the rack 15' is L/3.

Thus, according to the present invention, one ratchet may be used commonly so as to mesh with racks of different pitches.

In other words, the pitches of the racks in the tensioners in passenger cars are generally in the range from 0.75 to 2.00 mm; and more precisely, they are set at 0.75 mm, 1.00 mm, 1.50 mm and 2.00 mm. Accordingly, ratchets having the pitch of 3.00 mm and 2.00 mm are capable of meshing with all types of the existing racks. That is, the ratchet of the pitch 3.00 mm may mesh with the racks of 0.75 mm, 1.00 mm and 1.50 mm pitches; and the ratchet of the pitch 2.00 mm may mesh with the racks of 1.00 mm and 2.00 mm. Thus, by preparing the pitch of the ratchet as the common multiple of those of the racks, the ratchets may be used commonly with the racks of different pitches.

What is claimed is:

1. A ratchet type tensioner comprising a ratchet having a plurality of teeth and a rack, characterized in that the teeth of said teeth of the ratchet is n times that of the teeth of the rack, where n is an integer which is 2 or greater.

2. A tensioner according to claim 1 wherein n is 2.

3. A tensioner according to claim 1 wherein n is 3.

* * * * *